US012631325B1

(12) United States Patent
Li

(10) Patent No.: US 12,631,325 B1
(45) Date of Patent: May 19, 2026

(54) FLASHLIGHT CAPABLE OF RAPID BLADE REPLACEMENT

(71) Applicant: SYSMAX Innovations Co., Ltd., Guangzhou (CN)

(72) Inventor: Wenjie Li, Guangzhou (CN)

(73) Assignee: SYSMAX Innovations Co., Ltd., Guangzhou (CN)

( * ) Notice: Subject to any disclaimer, the term of this patent is extended or adjusted under 35 U.S.C. 154(b) by 0 days.

(21) Appl. No.: 19/200,115

(22) Filed: May 6, 2025

(30) Foreign Application Priority Data

Mar. 3, 2025 (CN) ......................... 202510243653.0

(51) Int. Cl.

| | |
|---|---|
| ***F21V 33/00*** | (2006.01) |
| ***B26B 5/00*** | (2006.01) |
| ***B26B 11/00*** | (2006.01) |
| ***F21L 4/08*** | (2006.01) |
| ***F21V 23/04*** | (2006.01) |

(52) U.S. Cl.
CPC .......... *F21V 33/0084* (2013.01); *B26B 5/001* (2013.01); *B26B 11/008* (2013.01); *F21L 4/085* (2013.01); *F21V 23/0414* (2013.01)

(58) Field of Classification Search
CPC ..... B26B 11/008; F21V 33/0084; F21V 23/04
See application file for complete search history.

(56) References Cited

U.S. PATENT DOCUMENTS

| | | | | |
|---|---|---|---|---|
| 5,315,760 | A * | 5/1994 | Emerson | B43L 19/00 362/120 |
| 6,044,560 | A * | 4/2000 | Chao | B26B 11/00 30/162 |
| 6,446,342 | B1 * | 9/2002 | Chang | B26B 11/00 30/162 |
| 6,874,188 | B2 * | 4/2005 | Johnson | B26B 5/003 30/162 |
| 10,632,633 | B2 * | 4/2020 | Bloch | B26B 5/001 |
| 2003/0016531 | A1 | 1/2003 | Galli | |
| 2006/0075570 | A1 | 4/2006 | Gelfand | |
| 2013/0025071 | A1 | 1/2013 | Keng | |

* cited by examiner

*Primary Examiner* — William J Carter
(74) *Attorney, Agent, or Firm* — Maier & Maier, PLLC

(57) ABSTRACT

A flashlight capable of rapid blade replacement is provided, the flashlight including a flashlight main body, opposing sides of the flashlight main body are respectively provided with an upper housing and a lower housing, the upper housing and the flashlight main body being enclosed to form a mounting chamber; a blade assembly, the blade assembly is movably disposed within the mounting chamber, the blade assembly is provided with a blade, a push member, and a latching fastener, the blade being detachably arranged between the push member and the latching fastener, the push member and the latching fastener being detachably connected; and a slot is provided at one end of the upper housing, the slot being configured to eject the blade. The flashlight drives the blade via the push member to adjust its protrusion length and allows for rapid detachment by sliding out of the slot, enhancing user experience.

9 Claims, 4 Drawing Sheets

FLASHLIGHT CAPABLE OF RAPID BLADE REPLACEMENT

CROSS-REFERENCE TO RELATED APPLICATIONS

The present application claims priority to Chinese Patent Application No. 202510243653.0, filed on Mar. 3, 2025, the content of all of which is incorporated herein by reference.

FIELD

The present application relates to the technical field of flashlights, in particular to a flashlight capable of rapid blade replacement.

BACKGROUND

In various scenarios such as outdoor activities, rescue operations and emergency response, flashlights serve as essential illumination tools. However, conventional flashlights provide only singular functionality, serving solely to provide illumination. To address this limitation, certain manufacturers have integrated cutting blades into standard flashlight structures for outdoor applications, thereby enhancing functional diversity.

Nevertheless, for the existing outdoor flashlights, the blades are fixedly arranged, being incapable of adjustment to modify the operational length or replacement to accommodate varying blade types based on situational requirements, thereby presenting an issue of inadequate flexibility in practical usage.

SUMMARY

In view of the aforementioned deficiencies in the prior art, an object of the present application is to provide a flashlight capable of rapid blade replacement, aiming to overcome the limitations of conventional outdoor flashlights where the blades are fixedly configured that prevents length adjustment and type replacement as required according to operational requirements.

The technical solution adopted in the present application to resolve the technical problems is as follows: providing a flashlight capable of rapid blade replacement, including:

- a flashlight main body, opposing sides of the flashlight main body are respectively provided with an upper housing and a lower housing, the upper housing and the flashlight main body are enclosed to form a mounting chamber;
- a blade assembly, the blade assembly is movably disposed within the mounting chamber, the blade assembly is provided with a blade, a push member, and a latching fastener, the blade is detachably arranged between the push member and the latching fastener, the push member and the latching fastener are detachably connected; and a slot is provided at one end of the upper housing, the slot is configured to eject the blade.

Optionally, a front cover is further provided on one side of the flashlight main body; a mounting portion extends from one side of the upper housing; the flashlight capable of rapid blade replacement is further provided with a light source assembly, the light source assembly is disposed within the mounting portion, the front cover is sleeved over the mounting portion, and the slot is disposed on a sidewall of the front cover at a position corresponding to the blade assembly.

Optionally, the upper housing is provided with a push button, the push button is connected to the push member; the push button is configured to actuate the push member, thereby causing the blade to move.

Optionally, the upper housing is provided with a sliding channel; the blade assembly is disposed within the sliding channel, the push button is configured to actuate the blade assembly to move along the sliding channel.

Optionally, a plurality of engagement grooves are provided on an inner side of the sliding channel; the push button is provided with a locking protrusion; and the engagement grooves is configured to engage with the locking protrusion.

Optionally, the push member is provided with a retention groove corresponding to the push button; a compression spring is disposed between the push button and the retention groove; and the compression spring is configured to maintain engagement between the engagement grooves and the locking protrusion.

Optionally, the blade is provided with an insertion slot, the latching fastener is provided with an insertion pin aligned with the insertion slot; the insertion pin extends through the slot to abut the push member.

Optionally, the flashlight main body is further provided with a control circuit board and an adjustment, the control circuit board is provided with a plurality of light source adjustment contacts and a power switch contact;

- a power key and an adjustment bracket are provided on a side surface of the flashlight main body, the adjustment bracket is provided with an adjustment key and a first opening; the adjustment key is positioned within the first opening and configured to move along the first opening;
- the power key is aligned with the power switch contact; when depressing the power key, the power switch contact is activated to control switching of the light source assembly;
- the first opening is provided with a plurality of engagement grooves, the engagement grooves align one-to-one with the light source adjustment contacts; when the adjustment key is slid into engagement with one engagement groove, the adjustment key abuts the light source adjustment contact aligned with the one engagement groove and activates the control circuit board to regulate a brightness of the light source assembly.

Optionally, the adjustment key is provided with a contact member and an elastic latching member, the adjustment key contacts the light source adjustment contacts via the contact member, the adjustment key engages with the engagement grooves via the elastic latching member;

- the power key is provided with an output protrusion, a buffer spring, and an abutment element, the buffer spring is sleeved over the output protrusion and disposed between the output protrusion and the abutment element, the power key contacts the power switch contact through the abutment element.

Optionally, the flashlight main body is further provided with an anti-slip hollow out member, the upper housing is provided with a second opening corresponding to the anti-slip hollow out member, the control circuit board is further provided with a plurality of indicator lights, each indicator light is electrically connected to a respective light source adjustment contact, and the anti-slip hollow out member is positioned above the indicator lights.

Compared to the prior art, the present application provides a flashlight capable of rapid blade replacement, including: a flashlight main body and a blade assembly, the blade assembly is movably disposed within a mounting chamber formed between the flashlight main body and an upper housing, the blade assembly is fixable in position after installation. The blade assembly includes: a blade; a push member; and a latching fastener, the push member is configured to drive the blade to adjust a protrusion length of the blade through a slot during operation, and enable rapid detachment of the blade by sliding it out of the slot. Thereby, allowing flexible adjustment of the blade length and rapid blade replacement to enhance user experience.

DETAILED DESCRIPTION OF EMBODIMENTS

Figure 1:
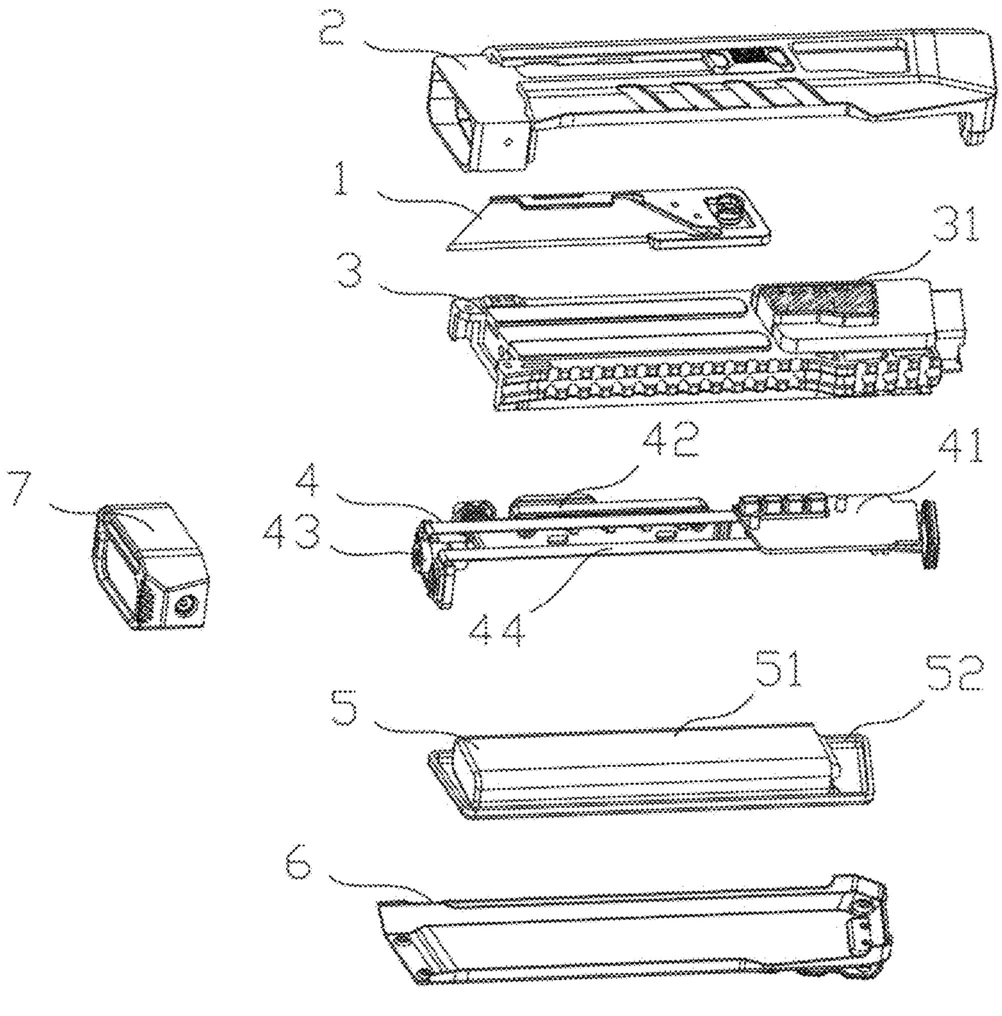
FIG. 1 is an exploded view of a flashlight capable of rapid blade replacement according to the present application.

The embodiments of the present application are described in detail herein. Examples of the embodiments are illustrated in the accompanying drawings. Throughout the specification, identical or similar reference numerals denote identical or similar components, or components having identical or similar functions. The embodiments described with reference to the drawings are exemplary and are used solely to explain the present application, and should not be interpreted as limiting the application.

In the description of the present application, it is to be understood that orientation or positional relationships indicated by terms such as "center", "longitudinal", "transverse", "upper", "lower", "front", "rear", "left", "right", "vertical", "horizontal", "top", "bottom", "inner", "outer" and the like are based on orientations or positional relationships illustrated in the accompanying drawings. These terms are used solely to facilitate the description of the application and simplify the explanation, and do not imply or require that the described apparatus or components must adopt specific orientations or operate in specific configurations, therefore, such terms should not be construed as limiting the application. Furthermore, terms such as "first" and "second" are used for descriptive purposes only and should not be interpreted as indicating relative importance, implicitly specifying the number of technical features, or implying any prioritization. Features formed with "first" or "second" can explicitly or implicitly include one or more such features. In the description of the application, unless expressly stated otherwise, the term "plurality" refers to two or more.

In the description of the present application, it should be noted that terms such as "dispose", "connect", and "engage" are to be interpreted broadly unless expressly formed or limited otherwise. For example, connections can be fixed, detachable, or integral; they can be direct or indirect through an intermediary medium. A person skilled in the art can ascertain the in specific meanings of the aforementioned terms in the context of the present application based on practical implementation.

With reference to FIG. 1, in a first embodiment of the present application, a flashlight capable of rapid blade replacement is provided with a flashlight main body 3 and a blade assembly 1; opposing sides of the flashlight main body 3 are respectively provided with an upper housing 2 and a lower housing 6, the upper housing 2 and the flashlight main body 3 being enclosed to form a mounting chamber. The blade assembly 1 is movably disposed within the mounting chamber, and the blade assembly 1 is provided with a blade 11, a push member 12, and a latching fastener 13. The blade 11 is detachably arranged between the push member 12 and the latching fastener 13, the push member 12 and the latching fastener 13 are detachably connected; and a slot is provided at one end of the upper housing 2, the slot being configured to eject the blade 11.

The installation process of the blade assembly 1 is as follows: the blade 11 is placed between the push member 12 and the latching fastener 13; the push member 12 and the latching fastener 13 are then engaged with the blade assembly 1, thereby assembling to obtain the blade assembly 1; the assembled blade assembly 1 is placed onto the upper housing 2 with the blade 11 aligned with the slot; and the upper housing 2 is then closed onto the flashlight main body 3, thereby connecting the blade assembly 1 to the flashlight main body 3.

Furthermore, in some embodiments, the upper housing 2 and the lower housing 6 can be an integral structure, with the upper housing 2 and the lower housing 6 collectively sleeved on the flashlight main body 3 as the integral structure. Alternatively, the upper housing 2, lower housing 6, and flashlight main body 3 can further be an unitary structure, that is, the upper housing 2, lower housing 6, and flashlight main body 3 constitute a monolithic structure formed from a single material; and shapes of the flashlight main body 3, upper housing 2, and lower housing 6 are not limited in the present application and may be cylindrical, prismatic, or other configurations.

The flashlight capable of rapid blade replacement according to the present embodiment includes the flashlight main body 3 and the blade assembly 1; the blade assembly 1 is movably disposed within the mounting chamber formed between the flashlight main body 3 and upper housing 2, and can be securely retained in position after the installation of the blade assembly 1; and the blade assembly 1 includes the blade 11, the push member 12, and the latching fastener 13; the blade 11 is driven by the push member 12 to move, thereby adjusting a protrusion length of the blade 11 through a slot for use. The blade 11 can further be slid out from the slot for rapid detachment; that is, the flashlight capable of rapid blade replacement according to the present application enables flexible adjustment of the blade 11 length and rapid blade 11 replacement, thereby enhancing user experience.

In some embodiments, a placement chamber is formed by closing the lower housing 6 onto the flashlight main body 3; the flashlight main body 3 is further provided with a light source assembly 43 and a power supply assembly 5; the light source assembly 43 is electrically connected to the power supply assembly 5; the light source assembly 43 is disposed on a side of the flashlight main body 3 opposite to the mounting chamber; and the power supply assembly 5 is located within the placement chamber.

The light source assembly 43 and the blade assembly 1 are positioned on different sides of the flashlight main body 3; the power supply assembly 5 and the blade assembly 1 are located in different chambers; the blade assembly 1, the light source assembly 43, and the power supply assembly 5 are mutually independent; during replacement or use of the blade assembly 1, a connection between the power supply assembly 5 and the light source assembly 43 is not affected, and an implementation of the illumination function is not affected.

In some embodiments, a front cover 7 is provided on one side of the flashlight main body 3; a mounting portion 27 extends from one side of the upper housing 2; the flashlight capable of rapid blade replacement is further provided with a light source assembly 43; the light source assembly 43 is disposed within the mounting portion 27; the front cover 7 is sleeved on the mounting portion 27; and the slot is disposed on the a sidewall of front cover 7 at a position corresponding to the blade assembly 1.

The light source assembly 43 is positioned in the mounting portion 27 and emits light through the front cover 7, thereby providing illumination. The blade assembly 1 is positioned on the sidewall of the front cover 7 and spaced apart from the light source assembly 43, such that an illumination function of the light source assembly 43 and a cutting function of the blade assembly 1 are mutually independent, enabling individual or simultaneous use based on user requirements. Furthermore, the light source assembly 43 and the blade assembly 1 are located in different chambers, such that the blade 11 replacement process in the blade assembly 1 does not affect the light source assembly 43 nor interfere with an implementation of functions of the light source assembly 43. Additionally, sharp edges of the blade 11 of the blade assembly 1 are prevented from damaging the light source assembly 43 and the power supply assembly 5.

In some embodiments, the upper housing 2 is provided with a push button 22, the push button 22 is connected to the push member 12; the push button 22 is configured to actuate the push member 12, thereby causing the blade 11 to move. The flashlight main body 3 and the upper housing 2, as well as the flashlight main body 3 and the lower housing 6, can both be fixedly closed and connected via a snap-fit connection, a screw connection, a bolt connection, a magnetic connection, or the like.

The latching fastener 13 is configured to connect the push member 12 and the blade 11, the latching fastener 13 is detachably connected to the push member 12; the push member 12 is provided with a first connection hole 123 for fixedly connecting to the latching fastener 13; the latching fastener 13 is provided with a protrusion corresponding to the first connection hole 123; the protrusion is engaged with the first connection hole 123, thereby clamping the blade 11 between the latching fastener 13 and the push member 12; alternatively, a passage corresponding to the first connection hole 123 may be provided on the blade 11, such that the protrusion passes through the passage to engage with the first connection hole 123, achieving fixation of the blade 11. Furthermore, a passage corresponding to the first connection hole 123 can be provided on the latching fastener 13, and a connecting rod corresponding to the first connection hole 123 is provided; the connecting rod sequentially passes through the corresponding passage on the latching fastener 13, and/or the corresponding passage on the blade 11, and the first connection hole 123, thereby fixing the blade 11 between the latching fastener 13 and the push member 12; the connecting rod may be a screw, a bolt, or the like.

The push button 22 on the upper housing 2 drives the push member 12 to move; the blade 11 is thereby moved accordingly; this driving mechanism is simple and easy to operate; the protrusion length of the blade 11 is controllable based on the pushing force applied for user convenience. After the blade 11 is fully pushed out or the latching fastener 13 is pushed out, the blade 11 can be replaced; when a connection between the blade 11 and the latching fastener 13 is exposed, the blade 11 can be removed for replacement; this replacement mechanism is simple, flexible, and requires no additional tools.

The light source assembly 43 and the blade assembly 1 can be disposed at one same end of the flashlight main body 3; alternatively, the light source assembly 43 and the blade assembly 1 can be axially opposed to each other and disposed at two ends of the flashlight main body 3. This configuration can be adjusted according to user preference or operational requirements, thereby improving user experience. The light source assembly 43 and the blade assembly 1 are co-disposed at one end of the flashlight main body 3 for convenient function switching or combined operation in low-light conditions.

In some embodiments, the flashlight main body 3 is further provided with a control assembly 4; the control assembly 4 is electrically connected to the power supply assembly 5; the light source assembly 43 is electrically connected to the control assembly 4, thereby establishing electrical connection with the power supply assembly 5 through the control assembly 4.

In some embodiments, the upper housing 2 is provided with a sliding channel 21; the blade assembly 1 is disposed within the sliding channel 21; the push button 22 is configured to actuate the blade assembly 1 to move along the sliding channel 21.

Figure 2:
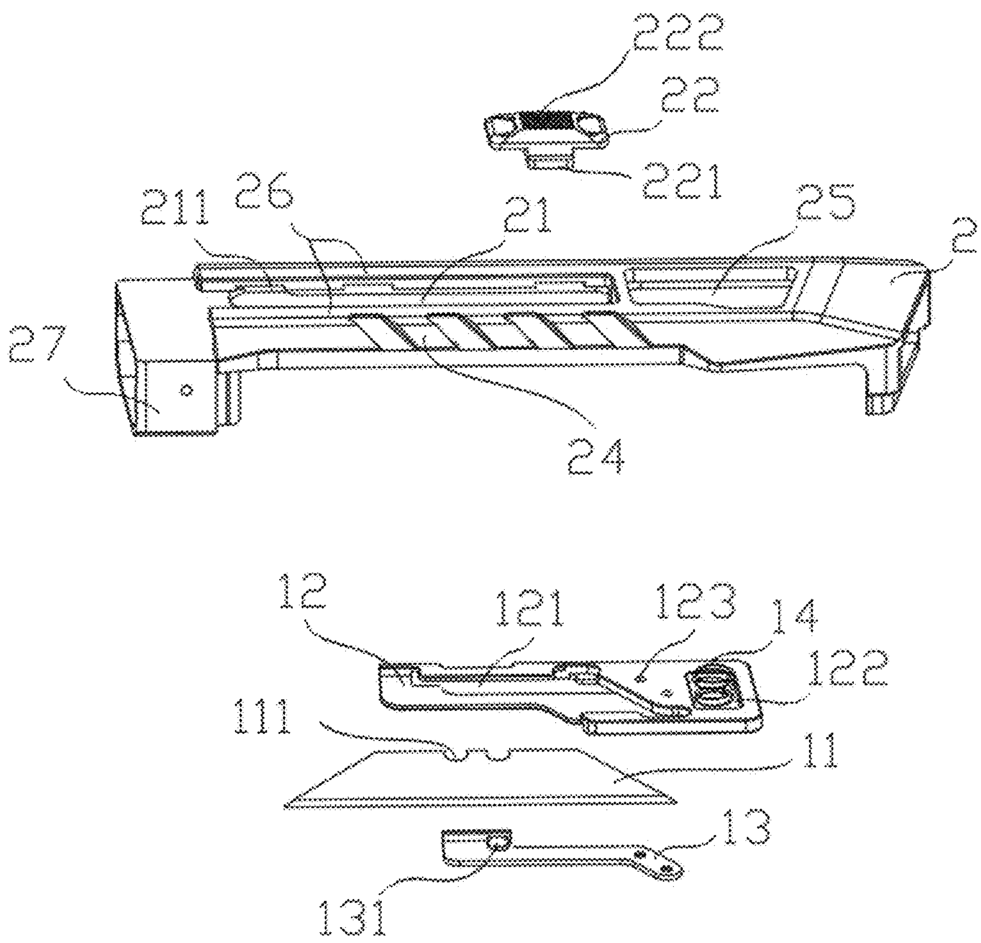
FIG. 2 is a schematic exploded view showing a blade assembly and an upper housing of the flashlight capable of rapid blade replacement according to the present application.

With reference to FIG. 2, furthermore, a plurality of locking recesses 211 are provided with on an inner side of the sliding channel 21; the push button 22 extends through the sliding channel 21 and is connected to the push member 12; the push button 22 is provided with a locking protrusion 221; the locking recesses 211 are configured to engage with the locking protrusion 221; the push button 22 is positioned within the sliding channel 21, extends through the sliding channel 21, and is connected to the push member 12.

The locking recesses 211 and the locking protrusion 221 are capable of engagement, thereby locking the push button 22 in position; in a locked state, the blade 11 becomes immobile, achieving a blade-locking effect through the engagement of the locking recesses 211 and the locking protrusion 221; therefore, when the blade 11 is not in use, the blade 11 can be fully retracted into the chamber and locked through the locking recesses 211 and the locking protrusion 221 to prevent accidental exposure of the blade 11 that can cause user injury; when the blade 11 is needed for operation, the blade 11 is protruded to a predetermined length and locked to prevent instability of the blade 11 that could result in insufficient cutting force; when the blade 11 is to be replaced, the locking protrusion 221 on the push button 22 is disengaged from the locking recesses 211 to unlock the blade 11, facilitating blade replacement; a number of locking recesses 211 can be vary based on practical requirements.

Furthermore, the push member 12 is provided with a retention groove 122 aligned with the push button 22; a compression spring 14 is disposed between the push button 22 and the retention groove 122; and the compression spring 14; is configured to maintain engagement between the locking recesses 211 and the locking protrusion 221. One end of the push member 12 is an output end, and the other end is a fixed end; the retention groove 122 is positioned on the push member 12 adjacent to the fixed end; the blade 11 is positioned at the output end of the push member 12, that is, the blade 11 is positioned on the push member 12 away from the fixed end.

The push member 12 and the push button 22 abut each other via the locking protrusion 221 and the retention groove 122; the compression spring 14 is sleeved on the locking protrusion 221 and positioned between the locking protrusion 221 and the retention groove 122. The locking protrusion 221 abuts and is fixed to the retention groove 122 along the axial direction through the compression spring 14; the locking protrusion 221 directly engages with the locking recesses 211 along the horizontal direction, thereby fixing the position of the push button 22 on the sliding channel 21.

In an unlocked state, the compression spring 14 is maintained in a compressed state, allowing the push button 22 to move along the sliding channel 21; when the push button 22 reaches any one of the locking recesses 211, the locking protrusion 221 inserts into the locking recesses 211; an elastic restoring force of the compression spring 14 ensures secure engagement between the locking protrusion 221 and the locking recesses 211, effecting locking the push button 22. To unlock, the push button 22 is depressed to disengage the locking protrusion 221 from the locking recess 211.

Furthermore, the blade 11 is provided with a insertion slot 111; the latching fastener 13 is provided with a insertion pin 131 aligned with the insertion slot 111; the insertion pin 131 passes through the insertion slot 111 and abuts against the push member 12. That is, through the insertion slot 111 on the blade 11 and the insertion pin 131 on the latching fastener 13, the blade 11 is fixedly connected to the push member 12 via the latching fastener 13; during subsequent replacement of the blade 11, the insertion slot 111 on the blade 11 only needs to be disengaged from the insertion pin 131 on the latching fastener 13.

The push member 12 can be provided with a sliding groove 121; the sliding groove 121 is arranged corresponding to the blade 11; the blade 11 is embedded in the sliding groove 121 and abuts against the push member 12; simultaneously, the insertion pin 131 of the latching fastener 13 passes through the insertion slot 111 of the blade 11 and abuts against the push member 12, enhancing connection stability between the latching fastener 13. The sliding groove 121 further isolates the blade 11 from other components inside the flashlight main body 3 and the upper housing 2, preventing damage to said components during blade 11 actuation.

To facilitate replacement of the blade 11, the latching fastener 13 and the push member 12 are detachably connected; the latching fastener 13 is provided with a through hole; the push member 12 is provided with a connector lug corresponding to the through hole; the connector lug on the push member 12 is positioned between the blade 11 and the retention groove 122, enabling the blade 11 to abut against the push member 12 through the insertion pin 131 extending through the insertion slot 111 on the blade 11, thereby improving connection stability; the push button 22 further enables complete exposure of both the latching fastener 13 and the connector lug, thereby facilitating removal of the latching fastener 13 for blade 11 replacement.

Furthermore, a surface of the push button 22 is provided with a friction surface 222 with anti-slip knurling to enhance frictional force between hands of user and the push button 22, thereby facilitating movement of the push button 22.

Figure 3:
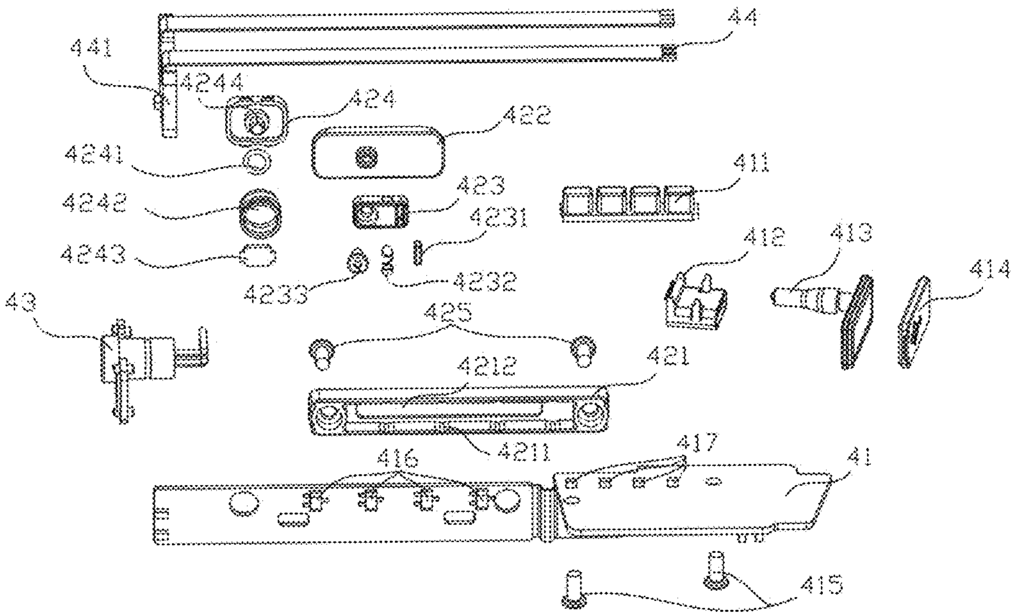
FIG. 3 is a schematic exploded view of a flashlight main body and a chamber of a lower housing (excluding a power supply assembly) of the flashlight capable of rapid blade replacement according to the present application.

In some embodiments, with reference to FIG. 3, the flashlight main body 3 is further provided with a control circuit board 41 and an adjustment assembly 42; the control circuit board 41 is provided with a plurality of light adjustment contacts 416 and a power switch contact; a side surface of the flashlight main body 3 is provided with a power key 424 and an adjustment bracket 421; the adjustment bracket 421 is provided with an adjustment key 423 and a first opening 4212; the adjustment key 423 is positioned within the first opening 4212 and is movable along the first opening 4212; the power key 424 is aligned with the power switch contact; when the power key 424 is depressed, the power switch contact is actuated to toggle the on/off state of the light assembly 43; the first opening 4212 is provided with a plurality of engagement recesses 4211; the engagement recesses 4211 align one-to-one with the light adjustment contacts 416; when the adjustment key 423 slides into engagement with an engagement recess 4211, the adjustment key 423 abuts against the light adjustment contact 416 aligned with one engagement groove 4211 and activates the control circuit board 41 to adjust a brightness of the light assembly 43. The control assembly 4 includes the control circuit board 41 and the adjustment assembly 42.

The first opening 4212 is positioned on the side surface of the flashlight main body 3 and is distinguishable from the push button 22 positioned on the sliding channel 21, thereby preventing misoperation. Pressing the power key 424 actuates the power switch contact, thus controlling the on/off state of the light assembly 43 through the control circuit board 41; sliding the adjustment key 423 to any engagement recess 4211 activates the aligned light adjustment contact 416, thereby adjusting a brightness of the light assembly 43 through the control circuit board 41.

Furthermore, the adjustment key 423 is provided with a contact element 4231 and an elastic latching element 4232; the adjustment key 423 contacts the light adjustment contact 416 through the contact element 4231; the adjustment key 423 engages with the engagement recess 4211 through the elastic element 4232; the power key 424 includes an output protrusion 4244, a buffer spring 4242, and an abutment element 4243; the buffer spring 4242 is sleeved over the output protrusion 4244 and positioned between the output protrusion 4244 and the abutment element 4243; the power key 424 contacts the power switch contact through the abutment element 4243; the control circuit board 41 is further provided with a plurality of indicator lights 417; the indicator lights 417 are electrically connected to the respective light adjustment contacts 416.

The elastic latching element 4232 is an elastic component, the elastic component is a spring with abutment beads at both ends; the adjustment key 423 is provided with a through passage allowing a passage of the abutment beads; the abutment beads engage with the engagement recesses 4211 to secure a position of the adjustment key 423. A sealing ring 4241 is further disposed between the output protrusion 4244 and the buffer spring 4242, enhancing connection integrity between the output protrusion 4244 and the buffer spring 4242.

The control circuit board 41 can further be provided with the indicator lights 417 electrically connected to the power switch contact, enabling recognition of the on/off state of the light assembly 43 of the flashlight with replaceable blades; that is, when the power switch contact contacts the power key 424 and the light adjustment contact 416 contacts the contact element 4231, a corresponding indicator light 417 illuminates, providing a visual feedback.

To facilitate adjustment of the brightness of the light assembly 43 through the adjustment key 423, the adjustment key 423 is provided with an external adjustment key 422; a surface area of the external adjustment key 422 is larger than a surface area of the adjustment key 423, facilitating user contact and sliding operation; the adjustment key 423 and the external adjustment key 422 are fixedly connected via a third fastener 4233; the adjustment bracket 421 and the control circuit board 41 are fixedly connected though a second fastener 425; the second fastener 425 can be a screw, bolt, or the like.

Figure 4:
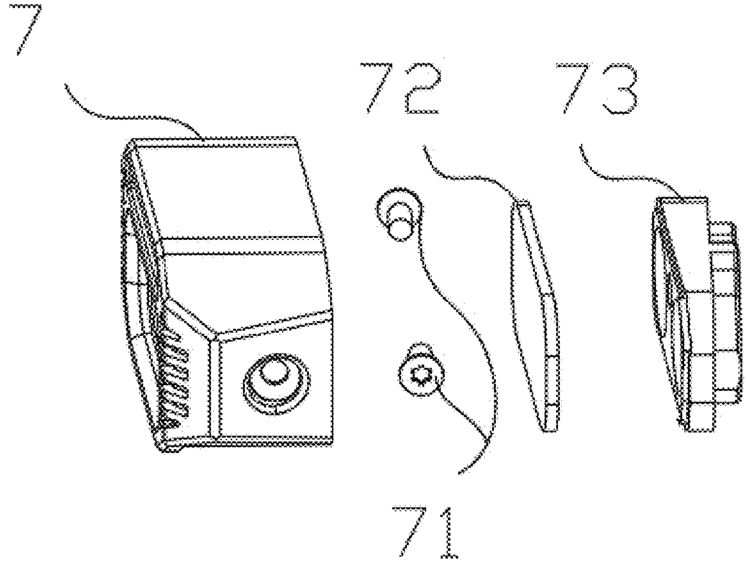
FIG. 4 is a schematic exploded view of a front cover of the flashlight capable of rapid blade replacement according to the present application.

With reference to FIG. 4, in some embodiments, the flashlight with rapidly replaceable blades further includes a charging connector 413; the light assembly 43 and the charging connector 413 are axially arranged at opposite ends of the control circuit board 41; the front cover 7 is positioned at an end of the flashlight main body 3 away from the charging connector 413; the power supply assembly 5 is positioned between the front cover 7 and the charging connector 413. The charging connector 413 is positioned at a rear end of the flashlight main body 3, exposed on an outer side, and configured to connect to an external power source to charge the power supply assembly 5 via the control circuit board 41; the front cover 7 is fixedly connected to the flashlight main body 3 through a fourth fastener 71.

The control circuit board 41 is further provided with a circuit board connector 412 and a charging socket 414; the circuit board connector 412 is configured to connect the charging connector 413 to the control circuit board 41; the charging socket 414 is disposed above the charging connector 413; a port of the charging socket 414 can be a USB port, Type-C port, or the like, facilitating charging of the flashlight with rapidly replaceable blades through external power sources such as power banks or mobile phones. The control circuit board 41 is fixedly connected to the upper housing 2 via a first fastener 415.

The light assembly 43 can include a primary light source and auxiliary light sources disposed on both sides of a primary light source; the auxiliary light sources can expand an illumination range, achieve uniform illumination, provide visual effects, and additionally serve as backup light sources. The light adjustment contacts 416 can respectively correspond to brightness adjustment of the primary light source and the auxiliary light sources.

The light assembly 43 is fixedly connected to a flexible printed circuit 44; the flexible printed circuit 44 is disposed within the placement chamber formed by the flashlight main body 3 and the lower housing 6, and the flexible printed circuit 44 is connected to the control circuit board 41, such that the light assembly 43 is electrically connected to the control circuit board 41 through the flexible printed circuit 44; a light source fastener 441 is disposed between the flexible printed circuit 44 and the light assembly 43; the flashlight main body 3 is provided with a projection corresponding to the flexible printed circuit 44. The push button 22 is positioned between the protrusion on the flashlight main body 3 and a first retaining member 26.

To facilitate movement of the push button 22, in some embodiments, the upper housing 2 is provided with a first retaining member 26 corresponding to the flexible printed circuit 44; both the push button 22 and the blade assembly 1 are positioned between the flexible printed circuit 44 and the first retaining member 26. The locking recesses 211 are positioned on the first retaining member 26; a space formed between the first retaining member 26 of the upper housing 2 and the flashlight main body 3 forms the sliding channel 21 for the blade assembly 1; a side surface of the sliding channel 21 allowing sliding-out of the blade 11 is formed as the slot on the upper housing 2.

An illumination surface 72 and a light source connector 73 are further disposed between the front cover 7 and the power supply assembly 5; the illumination surface 72 is positioned between the front cover 7 and the light source connector 73; the light source connector 73 stably connects the front cover 7 to the light assembly 43; the illumination surface 72 can be a transparent surface permitting light from the light assembly 43 to project outward, or alternatively configured as a lens surface (such as convex lens or concave lens) based on practical needs to enhance light projection efficiency.

In some embodiments, the flashlight main body 3 is further provided with an anti-slip hollow out member 31; the upper housing 2 is provided with a second opening 25 aligned with the anti-slip hollow out member 31; the anti-slip hollow out member 31 is positioned above the indicator lights 417; a side surface of the flashlight main body 3 is provided with the anti-slip knurling; an outer surface of the upper housing 2 is provided with anti-slip ribs 24.

The indicator lights 417 are configured to emit light via the anti-slip hollow out member 31 to provide user notification; concurrently, the anti-slip hollow out member 31 prevents direct contact between large foreign objects and the indicator lights 417, avoiding potential damage to the indicator lights 417; a lens cover 411 can further be disposed on the indicator lights 417 to enhance protection, preventing external contaminants or dust from contacting the indicator lights 417 and reducing alerting effectiveness. The lens cover 411 is positioned between the indicator lights 417 and the anti-slip hollow out member 31.

The side surface of the flashlight main body 3 is provided with the anti-slip knurling to increase friction coefficient, facilitating user gripping and handling; an outer surface of the upper housing 2 is provided with the anti-slip ribs 24 on one or both sides of the sliding channel 21; the anti-slip ribs 24 feature the anti-slip knurling to enhance friction between the hands of user and the upper housing 2, thereby serving as a fulcrum for sliding the push button 22.

Figure 5:
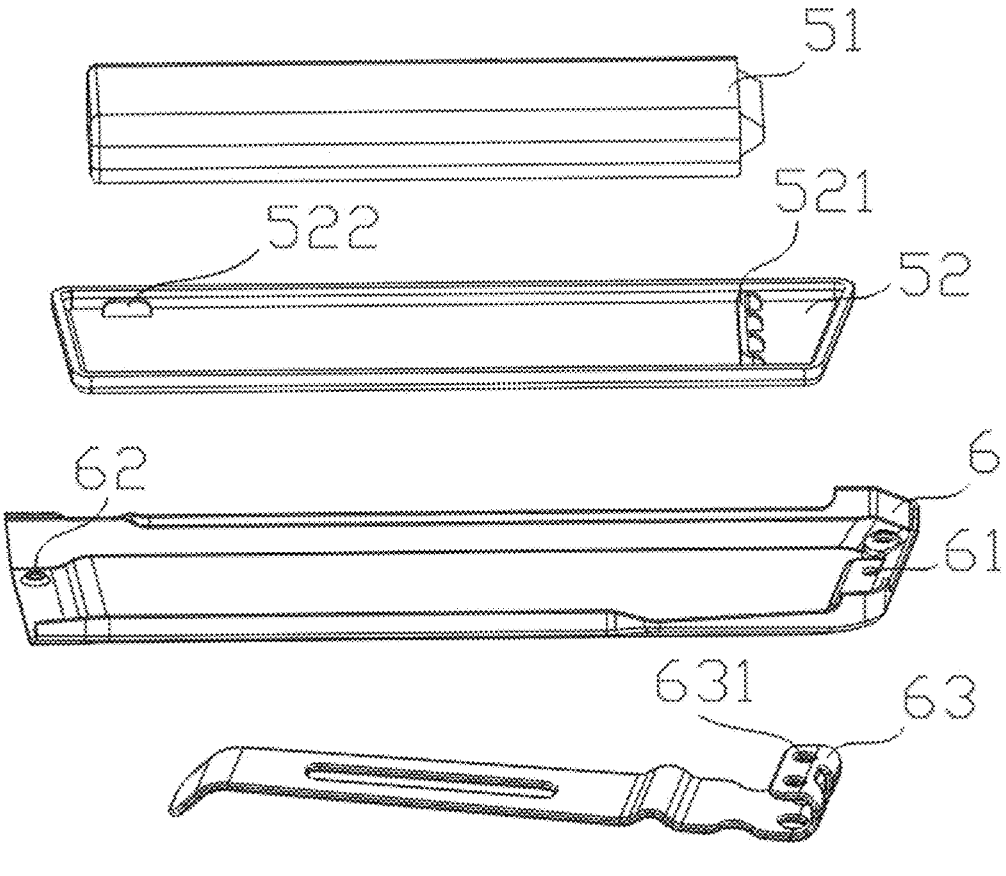
FIG. 5 is a schematic exploded view of the power supply assembly and the lower housing of the flashlight capable of rapid blade replacement according to the present application.

With reference to FIG. 5, in some embodiments, the power supply assembly 5 is positioned between the control assembly 4 and the lower housing 6; the power supply assembly 5 includes a battery 51 and a fixing bracket 52; the battery 51 is electrically connected to the control circuit board 41 of the control assembly 4 and is positioned between the control circuit board 41 and the lower housing 6; the battery 51 supplies power to the light assembly 43 via the control circuit board 41; the battery 51 receives power input from the charging socket 414 through the control circuit board 41 for charging; alternatively, the battery 51 routes power input from the charging socket 414 via the control circuit board 41 to supply the light assembly 43; the fixing bracket 52 is positioned between the lower housing 6 and the battery 51 to support the battery 51 and concurrently protect the battery 51.

Concurrently, the fixing 52 is provided with a second retaining member 521 and a third retaining member 522, configured to restrict the battery 51 along the longitudinal and lateral directions, to secure the position of the battery 51; the lower housing 6 is provided with a connection handle 63 on a side opposite to the power supply assembly 5; the connection handle 63 facilitates portability by the user.

The lower housing 6 is provided with a second connection hole 61 and a third connection hole 62; the second connection hole 61 aligns with a fourth connection hole 631 on the connection handle 63, thereby fixedly connecting the lower housing 6 and the connection handle 63; the third connection hole 62 is configured to connect the lower housing 6 and the front cover 7. Aligning with the first connection hole 123, connector rods respectively corresponding to the second connection hole 61 and the third connection hole 62 are provided to connect the lower housing 6 to the connection handle 63 and the lower housing 6 to the front cover 7, respectively; the connector rods can be screws, bolts, or the like.

In summary, the present application provides a flashlight capable of rapid blade replacement, including: a flashlight main body and a blade assembly, the blade assembly is movably disposed within a mounting chamber formed between the flashlight main body and an upper housing, the blade assembly is fixable in position after installation. The blade assembly includes: a blade; a push member, and a latching fastener, the push member is configured to drive movement of the blade to adjust a protrusion length of the blade through a slot during operation, and enable rapid detachment of the blade by sliding it out of the slot. Thereby, allowing flexible adjustment of the blade length and rapid blade replacement to enhance user experience.

It is finally to be noted that the aforementioned embodiments are merely illustrative for explaining the technical solutions of the present application, and are not to be construed as limitations thereto. Although the present application has been described in detail with reference to the aforementioned embodiments, those skilled in the art shall understand that modifications may still be made to the technical solutions recited in the embodiments, or equivalent substitutions may be applied to partial technical features. Such modifications or substitutions shall not render the essence of the corresponding technical solutions to depart from the spirit and scope of the technical solutions set forth in the embodiments of the present application.

What is claimed is:

1. A flashlight configured for rapid blade replacement, the flashlight comprising:

- a flashlight main body, wherein:
  - an upper housing and a lower housing are disposed on opposing sides of the flashlight main body, respectively, and
  - the upper housing and the flashlight main body are enclosed to form a mounting chamber; and
- a blade assembly, wherein:
  - the blade assembly is movably disposed within the mounting chamber,
  - a blade, a push member, and a latching fastener are disposed on the blade assembly, and
  - the blade is detachably arranged between the push member and the latching fastener, the push member and the latching fastener being detachably connected;
- wherein:
  - a slot is disposed at one end of the upper housing, the slot being configured to eject the blade;
  - a front cover is further disposed on one side of the flashlight main body;
  - a mounting portion extends from one side of the upper housing;
  - a light source assembly is further disposed on the flashlight, the light source assembly being disposed within the mounting portion;
  - the front cover is sleeved over the mounting portion; and
  - the slot is disposed on a sidewall of the front cover at a position corresponding to the blade assembly.

2. The flashlight configured for rapid blade replacement according to claim 1, wherein:

- a push button is disposed on the upper housing;
- the push button is connected to the push member; and
- the push button is configured to actuate the push member, thereby causing the blade to move.

3. The flashlight configured for rapid blade replacement according to claim 2, wherein:

- a sliding channel is disposed on the upper housing;
- the blade assembly is disposed within the sliding channel; and
- the push button is configured to actuate the blade assembly to move along the sliding channel.

4. The flashlight configured for rapid blade replacement according to claim 3, wherein:

- a plurality of engagement grooves is disposed on an inner side of the sliding channel;
- a locking protrusion is disposed on the push button; and
- the engagement grooves are configured to engage with the locking protrusion.

5. The flashlight configured for rapid blade replacement according to claim 4, wherein:

- a retention groove corresponding to the push button is disposed on the push member;
- a compression spring is disposed between the push button and the retention groove; and
- the compression spring is configured to maintain engagement between the engagement grooves and the locking protrusion.

6. The flashlight configured for rapid blade replacement according to claim 1, wherein:

- an insertion slot is disposed on the blade;
- an insertion pin corresponding to the insertion slot is disposed on the latching fastener; and
- the insertion pin extends through the slot to abut the push member.

7. The flashlight configured for rapid blade replacement according to claim 1, wherein:

- a control circuit board and an adjustment are further disposed on the flashlight main body;
- a plurality of light source adjustment contacts and a power switch contact are disposed on the control circuit board;
- a power key and an adjustment bracket are disposed on a side surface of the flashlight main body;
- an adjustment key and a first opening are disposed on the adjustment bracket;
- the adjustment key is positioned within the first opening and configured to move along the first opening;
- the power key is aligned with the power switch contact;
- a plurality of engagement grooves is disposed on the first opening, the engagement grooves corresponding one-to-one with the light source adjustment contacts;
- when depressing the power key, the power switch contact is activated to control switching of the light source assembly; and
- when the adjustment key is slid into engagement with one engagement groove, the adjustment key abuts the light source adjustment contact corresponding to the one engagement groove and activates the control circuit board to regulate a brightness of the light source assembly.

8. The flashlight configured for rapid blade replacement according to claim 7, wherein:

- a contact member and an elastic latching member are disposed on the adjustment key, the adjustment key contacting the light source adjustment contacts via the contact member, and the adjustment key engaging with the engagement grooves via the elastic latching member; and
- the power key comprises an output protrusion, a buffer spring, and an abutment element, the buffer spring being sleeved over the output protrusion and disposed between the output protrusion and the abutment element, and the power switch contacting the power switch contact through the abutment element.

9. The flashlight configured for rapid blade replacement according to claim 8, wherein:

an anti-slip hollow out member is further disposed on the flashlight main body;

a second opening corresponding to the anti-slip hollow out member are disposed on the upper housing;

a plurality of indicator lights is disposed on the control circuit board, each of the indicator lights is being electrically connected to a respective light source adjustment contact; and the anti-slip hollow out member is positioned above the indicator lights.

* * * * *